July 17, 1934.  C. J. DUDLEY  1,966,813
BASKET COVER
Filed Jan. 23, 1930
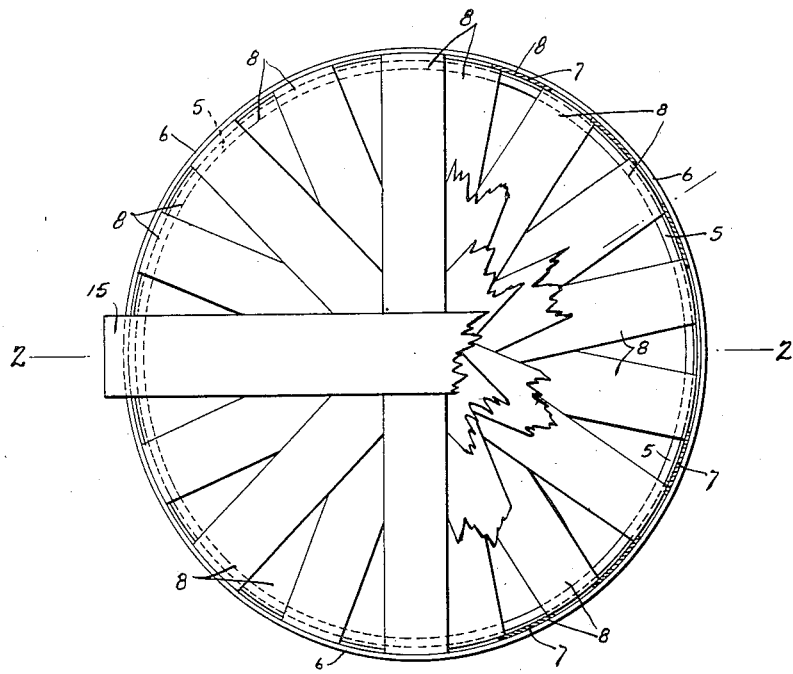
Fig. 1.
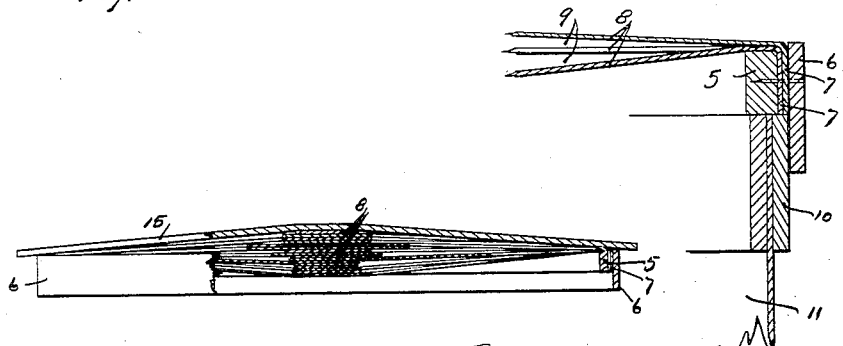
Fig. 2.
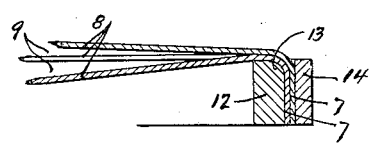
Fig. 4.
Fig. 3.
INVENTOR
COLON J. DUDLEY
By
ATTORNEY Patented July 17, 1934

1,966,813

UNITED STATES PATENT OFFICE 1,966,813

BASKET COVER

Colon J. Dudley, Hamburg, N. Y.

Application January 23, 1930, Serial No. 422,918

3 Claims. (Cl. 217—124)

My invention relates generally to an article of manufacture, and in particular to a fabricated cover for bushel baskets, and a method of making it.

It is well known to those skilled in the art that in the present type of bushel basket covers, a number of relatively wide, thick strips are placed across a hoop and nailed in position. These strips are so stiff that when the cover is forced down upon the basket, the fruit contained in the basket will be bruised. Furthermore, such covers have wide open spaces between the slats or strips which expose the contents of the basket to damage and pilfering. Moreover, such a cover is not very strong, and if forced tightly down upon the contents of the basket, many times the ends of the slats are torn loose.

The principal object of my invention has been to provide a device which shall overcome the above disadvantages.

Another object has been to provide a cover so fabricated that it shall conceal the contents of the basket to which it is attached, while at the same time providing for the necessary ventilation.

Moreover, my cover is made of thin veneering and is thus flexible so that it will yield to pressure of the contents of the basket without injuring the same.

Furthermore, my method of making basket covers is such that the ends of the slats are turned over substantially at right angles and secured between two hoops.

Another object has been to provide a device which shall be very durable and one easy and cheap to manufacture.

The above objects and advantages have been accomplished by the device shown in the accompanying drawing, of which:

Fig. 1 is a plan view of my basket cover, with portions broken away.

Fig. 2 is a sectional view, taken on line 2—2 of Fig. 1.

Fig. 3 is an enlarged, sectional view.

Fig. 4 is a fragmentary, sectional view of a modified form of construction.

My device comprises an inner hoop 5 and an outer hoop 6, between which are secured the ends 7 of the slats 8. The inner hoop 5 is substantially the same diameter as the outer hoop 10 of the basket with which my cover is to be used, and this hoop rests upon such basket hoop when the cover is in place. The outer hoop 6, however, is large enough in diameter to fit over the outer hoop 10 of the basket 11 and wide enough to fit down over the outer hoop of the basket, thus sealing the joint between the basket and the cover. This hoop also centers the cover on the basket and prevents it from shifting on the basket.

The slats 8 of my cover are made of thin veneer material such as that used for basket staves. Since the diametrical distance across the basket is considerably less than the length of a basket stave, it is possible with my invention to use pieces of veneer material which would otherwise be wasted, since the defective ends or portions thereof may be cut off, leaving a good piece of material which is suitable for carrying out my invention but which would be worthless as a piece of material to go into the construction of a basket.

As pointed out in the preamble, my cover is designed to substantially conceal the contents of the basket, but at the same time provide for proper ventilation. It is necessary, therefore, that the slats be of such a width and number that they will substantially cover the inside hoop 5. By arranging the slats diametrically and in series, i. e., by applying them to the hoops in layers, I strengthen the structure and provide for the ventilating feature of my invention. In applying the hoops, the layers may comprise only two slats each, the slats of each layer being preferably arranged at right angles to each other. The adjacent slats of each of the adjacent layers are arranged at such an angle with each other that the slats of all of the series of layers will be so positioned that the circle around the hoop 5 will be completely covered and ventilating spaces 9 provided, because of the interlapping arrangement of the slats. It is not essential that the slats of any layer be equidistantly arranged so long as they are arranged at an angle with and spaced apart from the next adjacent slat, so that the necessary ventilating spaces are formed.

The length of each of the slats 8 is greater than the diameter of the basket cover, and the ends 7 thereof extend beyond the inside hoop 5 a distance equal to preferably the height of this hoop. After the layers or groups of slats have been assembled, as above pointed out, the projecting ends 7 are turned down preferably at substantially right angles to the slats, whereupon the outside hoop 6 is placed around the bent ends and inner hoop 5, whereupon the two hoops are stitched together preferably by means of staples or other suitable fastening means. These staples, of course, pass not only through the hoops but through the ends 7, thus securely holding the slats 8 in position upon or between the hoops.

In Fig. 4 I have shown an inner hoop 12 of slightly modified form having its edge 13 rounded-off so that the ends 7 will be connected to the slats 8 by a curved surface instead of a relatively sharp corner as is the corner in the form shown in Fig. 3. In this Fig. 4 also is shown an outer hoop 14 which is of substantially the same width as the inner hoop 12 and does not, therefore, extend over the basket hoop.

My cover may be secured to the basket 11 in any of the well known ways, as, for instance, by means of the usual cross slat 15 shown in Fig. 1. If the cross slat 15 is not used, then other suitable fasteners (not shown) may be employed for holding the cover in place, and in such case an additional slat 8 would be used to complete the cover.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A flexible cover comprising an inner and an outer hoop located in substantially the same plane, and a plurality of relatively thin slats, said slats being arranged in superposed layers and having the ends of adjacent slats overlapped and interposed between the hoops, the slats of the lower layer having their ends in interspaced relation with each other, and the next upper layer of slats being so angularly arranged with each other and so positioned with respect to the lower layer that the gaps between the lower layer of slats are covered.

2. A flexible cover comprising an inner and an outer hoop located in substantially the same plane, and a plurality of relatively thin slats, said slats being arranged in superposed layers and having the ends of adjacent slats overlapped and interposed between the hoops, the slats of the lower layer being so located that gaps are formed between their adjacent ends, the upper layer of slats being in interspaced relation with each other and with the lower layer and having their ends staggered in relation to the ends of the lower layer, whereby there is no opening between the slats in a vertical plane but openings are formed in a horizontal plane.

3. A flexible cover comprising an inner and an outer hoop located in substantially the same plane, a plurality of diametrically arranged, relatively thin flexible slats having their ends interposed between the hoops in fixed relation thereto, said slats extending from one side of the hoops to the other side thereof and being arranged in layers, the slats of the layers being so angularly arranged with respect to each other that the edges of the exposed surfaces of adjacent slats are overlapped, whereby adequate ventilation is provided and the cover is reinforced at its central portion to resist pressure caused by the weight of baskets when stacked on each other.

COLON J. DUDLEY.